United States Patent [19]
Deckas

[11] 3,802,168
[45] Apr. 9, 1974

[54] ROOM AIR CLEANER
[75] Inventor: Peter C. Deckas, Edina, Minn.
[73] Assignee: Dexon, Inc., Minneapolis, Minn.
[22] Filed: Nov. 22, 1971
[21] Appl. No.: 201,078

[52] U.S. Cl............ 55/473, 55/356, 55/481,
 55/497, 55/500, 98/33 A
[51] Int. Cl............................. B01d 46/10
[58] Field of Search.................. 98/33 A;
 55/356-357, 472-473, 481, 495, 497, 500,
 501, 521, DIG. 29, DIG. 31, 509

[56] References Cited
UNITED STATES PATENTS

| | | | |
|---|---|---|---|
| 3,375,640 | 4/1968 | Pelosi | 55/473 X |
| 2,749,725 | 6/1956 | Essman et al. | 62/281 |
| 1,614,817 | 1/1927 | Andrew | 55/316 X |
| 2,808,124 | 10/1957 | Attwood | 55/473 X |
| 2,178,614 | 11/1939 | Slayter | 55/DIG. 31 |
| 2,992,702 | 7/1961 | Reid | 55/DIG. 31 |
| 3,344,590 | 10/1967 | Smith et al. | 55/516 X |
| 3,703,801 | 11/1972 | Deckas | 55/473 |
| 3,513,643 | 5/1970 | Tarala | 55/473 |
| 3,616,624 | 11/1971 | Marsh | 55/472 |
| 3,494,112 | 2/1970 | Deckas | 55/473 X |
| 2,759,713 | 8/1956 | Maniscalco | 20/153 X |
| 3,712,033 | 1/1973 | Gronholz | 55/497 X |

Primary Examiner—Frank W. Lutter
Assistant Examiner—Vincent Gifford
Attorney, Agent, or Firm—Frederick E. Lange

[57] ABSTRACT

A room air cleaner for filtering out extremely fine particles of matter, there being a fine particle filter forming substantially the entire front wall of a housing which is releasably disposed over a base member supporting a blower and a prefilter on the intake side of the blower. The housing with the exception of the fine filter, is formed of a relatively inexpensive metallic or nonmetallic material and is preferably coated or covered with an ornamental layer. The fine particle filter has an ornamental screening over its front to enhance the appearance of the housing and is readily removable from the housing to facilitate replacement. The prefilter is slidably supported on the base member below the blower so that it can readily be replaced.

5 Claims, 7 Drawing Figures

PATENTED APR 9 1974
3,802,168
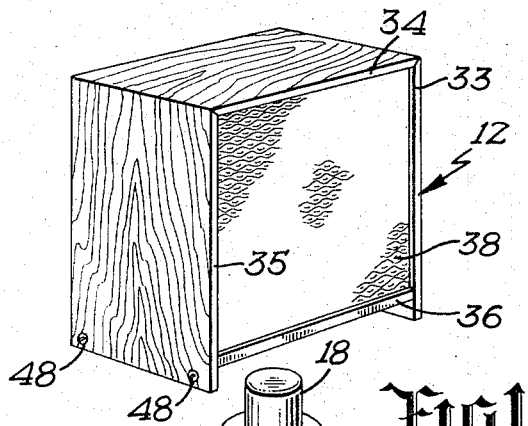
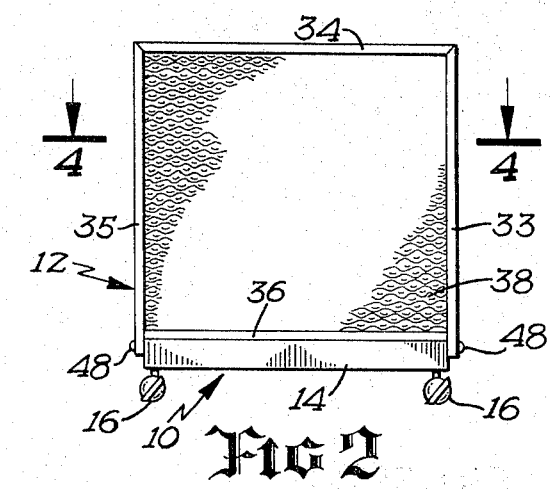
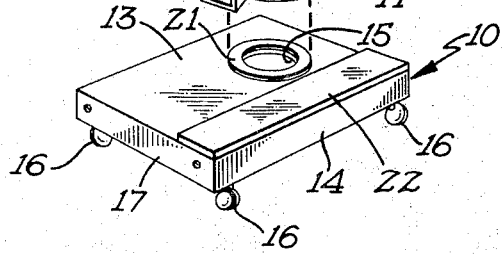
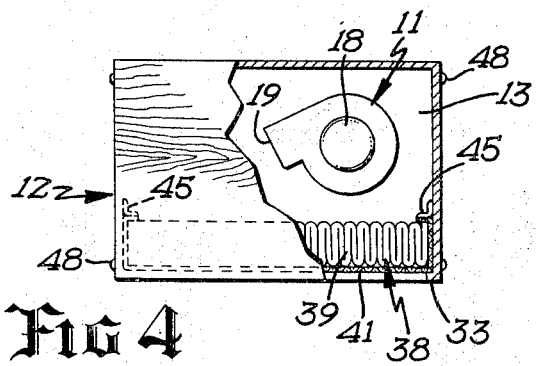
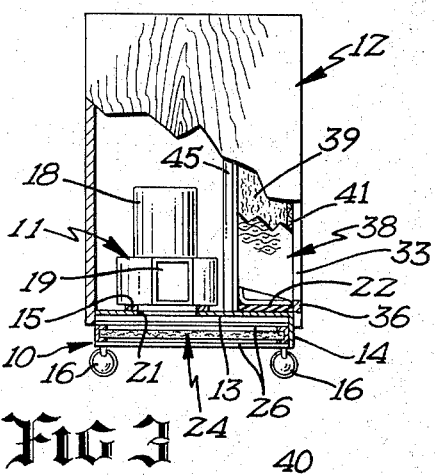
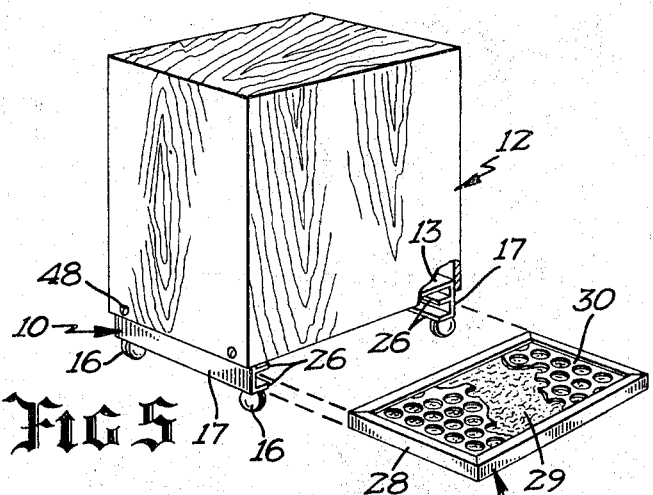
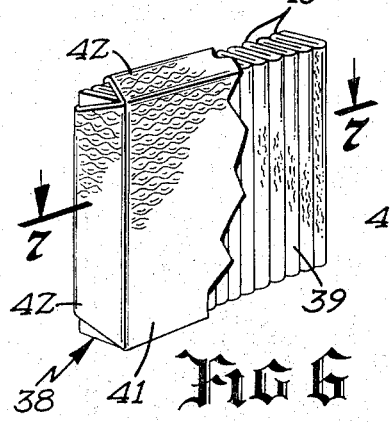
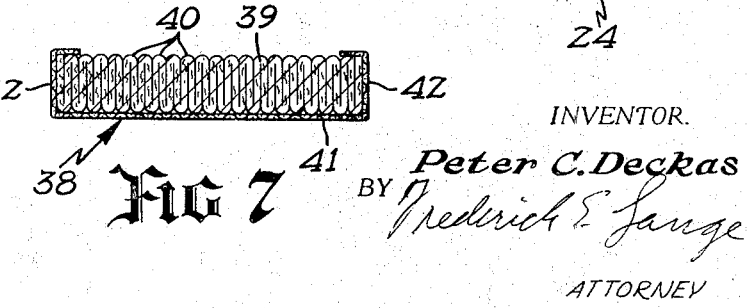
INVENTOR.
Peter C. Deckas
BY Frederick E. Lange
ATTORNEY

ROOM AIR CLEANER

BACKGROUND OF THE INVENTION

There is considerable need for a small inexpensive air cleaner which can be placed in a room in a home or some other enclosed space and which will remove microscopic particles from the air. There are numerous so-called air cleaners for room use. Some of these are of the electrostatic type which are relatively expensive since they require an extremely high voltage source. Furthermore, they do not trap all of the particles since some particles pass through the electrostatic field without actually moving to the collector plate.

There are also numerous cleaners in which the filtering element is relatively coarse. While these are effective in removing relatively large particles, they do not remove the microscopic particles that are such an irritant to people who are allergic to certain forms of dust or pollen.

There has been in existence for some time a filter for removing extremely fine particles. One common filter of this type is a filter commonly referred to as an HEPA filter. Such a filter is extremely effective at removing microscopic particles. An HEPA medium filter, which is adequate for the purposes of purifying a room so that it is comfortable for people with allergic tendencies is 99 percent in preventing the passage of particles 0.5 microns in size or larger. Air cleaners employing such filters have not, however, been available in units inexpensive enough for use in many applications such as the home. Furthermore, any air cleaner employing such a filter and intended for use in a home must have provision for ready replacement of the filter since it is obvious that a filter which blocks the passage of extremely fine particles cannot be used indefinitely without becoming relatively resistant to passage of air therethrough.

SUMMARY OF THE INVENTION

The present invention is concerned with a small air cleaner for removing extremely fine particles in which there is a pre-filter of a standard type and which can be readily replaced and a readily replaceable fine filter which forms part of a removable housing. Both the prefilter and the housing are supported on a base member which supports a blower drawing air through the prefilter and forcing it out through the fine filter of the housing.

The housing may be formed of any inexpensive material such as sheet metal or particle board and covered with an ornamental layer or coating. For example, the ornamental layer or coating may simulate wood grain. The front of the fine filter preferably is covered with an ornamental screen to further enhance the ornamental appearance of the cleaner.

The housing is preferably shaped to telescopically fit over the upper portion of the base member. In this manner, it can be readily removed by the release of simple fastening means. The fine filter is releasably held in the housing so that when the housing is removed, the filter can be readily withdrawn from the housing and replaced. The prefilter may be slidably mounted on the base member so that it can be readily movable. The prefilter may be an ordinary furnace filter so that a replacement can be purchased readily.

Other objects and features of the invention will be apparent from a consideration of the accompanying specification, claims and drawing.

BRIEF DESCRIPTION OF THE DRAWING

FIG. 1 is an exploded perspective view of my improved air cleaner showing the front, one side and the top of the cleaner;

FIG. 2 is a front elevational view of the cleaner;

FIG. 3 is a side elevational view of the cleaner with a portion in section;

FIG. 4 is a top plan with a portion shown in section;

FIG. 5 is a perspective view showing the rear of the cleaner and partially exploded to show the prefilter removed from its position in the base member;

FIG. 6 is a perspective view of the fine filter with a portion of the protective ornamental screening broken away to show the filter itself; and FIG. 7 is a sectional view taken along the line 7—7 of FIG. 6.

DESCRIPTION OF PREFERRED EMBODIMENT

Referring to FIG. 1, the air cleaner of the present invention comprises a base member 10, a motor operated blower 11 and a housing 12, the housing and blower being mounted on the base member 10. The base member 10 is in the form of a rectangular frame having a base plate 13, a front flange 14 and side flanges 17. The base plate 13 has an opening 15 extending through it. The three flanges 14 and 17 preferably have four casters 16 secured thereto to support the air cleaner in such a manner that the air cleaner may be conveniently moved around the room or other area in which the cleaner is located.

The blower 11 is any suitable motor operated blower having a motor 18 driving a blower, the intake of which is below the blower unit 11 and the outlet of which is indicated by a reference numeral 19, the outlet being disposed so as to direct the air in a horizontal direction. The motor operated blower unit is preferably so mounted on the base that the air issuing from outlet 19 is directed at an angle to the sides of the base member, as best shown in FIGS. 1 and 4.

As best shown in FIG. 3, an annular gasket 21 is disposed on the base plate surrounding the opening 15 and acts to seal the intake of the motor operated blower unit 11 with respect to the base plate 13. The blower unit may be clamped to the base plate 13 by any suitable means, not shown. A strip 22 of resilient gasket material is secured to the base plate 13 and is adapted when the housing 12 is in position on the base member 10 to seal the lower end of the fine filter against air leaks.

Disposed between the opposite side flanges 17 is a prefilter 24 for removing relatively coarse particles from the air before it enters the blower. This prefilter is slidably supported by two pair of flanges 26 secured to the side flanges 17 of the base member 10 and projecting inwardly. The flanges of each pair of flanges 26 are spaced apart by a distance slightly in excess of the thickness of the prefilter 24 so that the prefilter 24 may be conveniently inserted from the rear of the cleaner by sliding it in between the pairs of flanges 26 until it abuts the front flange 14 of the base member. The prefilter 24 may be a conventional type of filter such as used in forced warm air furnaces and which can be readily purchased at any hardware store. Such prefilters normally involve a cardboard outer frame 28 holding a loosely matted fibrous filter 29 and a pair of perforated metal sheets 30 disposed on opposite sides of the filter material to retain it in place. The fibrous material may in many cases have a coating of viscous material to retain dust particles and force them to cling to the fibers as the air passes through the filter. The fact that the apparatus is designed to use ordinary furnace filters which are extremely inexpensive reduces the cost of replacing the prefilters and encourages their frequent replacement to lengthen the life of the fine particle filter to be discussed later.

The housing 12, as is clearly evident from FIGS. 1-5, is generally rectangular in cross-section having an open bottom and an open front except for four narrow flanges 33, 34, 35 and 36 extending around the periphery of the front of the housing 12 and forming a frame. The housing 12 can be made of inexpensive sheet material, such as sheet metal, which has an ornamental coating applied to it. As shown in FIG. 1, the coating is made to simulate wood grain. The housing may also be formed of particle board. In this case, the particle board is covered with an ornamental vinyl layer which again may simulate wood or may be designed to create any other decorative effect.

Disposed adjacent the front of the housing 34 is a filter 38 for filtering out microscopic particles. This filter is of the type commonly referred to as the HEPA (high efficiency particulate air) type. There are several types of HEPA filters having varying degrees of effectiveness. A filter for the purpose of the present invention can be the HEPA medium filter. Such a filter is 99 percent efficient in removing particles 0.5 microns or larger. As best shown in FIG. 7, the filter comprises a layer of filter material 39 which is folded back and forth to provide a plurality of vertically extending layers 40. Because of the manner in which the filter is folded along vertical lines, the filter causes a laminar flow of any air passing through the filter. The filter assembly is held together by employing an ornamental metallic grill 41 which extends across the entire front of the filter 38 and has portions 42 extending around the back of the filter. This is best shown in FIGS. 6 and 7. The grill member 41 thus has several functions. In the first place, it provides an ornamental appearance to the front of the filter 38 when it is in place in the housing 12. At the same time, by reason of the side portions 42, it holds the folds of the filter in place to permit its ready handling while being inserted into and being removed from the housing 12.

A continuous flexible gasket 45 of rubber or similar material is secured to the interior of the top and side walls of the housing 12 and is spaced from the front flanges 33, 34, 35 and 36 by a distance approximately equal to the thickness of the filter 38. The gasket 45 has a flexible flap engaging the filter 38, as shown, and the air pressure produced by blower 11 pushes this flap against the filter to form a seal against leakage of air around the side and top edges of the filter. Leakage under the bottom edge of filter 38 is prevented by gasket 22 which is pressed between the bottom of the gasket and the base plate 13. The gasket 22 is preferably of a width approximately that of the fine filter 38 to provide a sealing surface of substantial area. When the housing 12 is removed and inverted, it is possible to readily insert the filter 38 by sliding it between the gasket 45 and the front flanges 33, 34, 35 and 36. The filter 38 is sufficiently thick that it tends to be retained in place so that when the housing 12 is inverted, it will not fall out.

The housing 12 preferably has an interior cross-sectional configuration corresponding in shape and size to the external configuration of the base member 12 so that the housing telescopically fits over the base member. A series of screws 48 extend through the side walls of the housing 12 adjacent the bottom thereof and hold the housing in position with respect to the base member 10. The housing is actually firmly supported with respect to base member 10 even without the screws 48 since the filter 38 engages the gasket 22 upon the base plate 13 and limits downward movement of the housing. Since the housing 12 telescopically fits over the base member 10, the weight of the housing causes it to remain firmly in place on the base member. The detachable screws 48, however, ensure against any accidental dislodgement of the housing or its casual removal of children or others.

When it is desired to remove the filter 38 and replace it with a new one, it is only necessary to remove the screws 48 and lift the housing 12 off the base member. The filter 38 can then be readily removed and replaced by a new one. Thus, it is possible to rather easily replace the fine filter whenever that is necessary.

While I have shown an arrangement in which the filter 38 is removed from the bottom of housing 12 after it has been withdrawn from the base member 10, it will be understood that the filter 38 can be mounted on a removable front frame so as to be removable from the front of the housing without removing the housing from the base member.

CONCLUSION

It will be seen that I have provided an air cleaner suitable for use in a room or other enclosed space which is capable of removing microscopic particles from the air, such particles being of the type which are aggravating to allergy victims. The unit is relatively inexpensive and uses a standard prefilter of the type which can be purchased in any hardware store. The housing, while ornamental, is fabricated out of relatively inexpensive materials. The filter for removing fine particles can be quickly changed. A minimum number of fastening means is employed. If, in the course of time, the housing becomes marred in use, the entire housing can be replaced with a relatively minor investment, creating the appearance of an entirely new unit.

While I have described a specific embodiment of my invention, it is to be understood that this is for purposes of illustration only and the invention is to be limited solely by the scope of the appended claims.

I claim as my invention:

1. An air cleaner for cleaning the air in an enclosed space, said cleaner comprising:

a rectangular base member having means for supporting the same in a horizontal position on a supporting surface such as the floor and comprising a horizontal wall having an intake opening through a portion thereof, a removable housing rectangular in cross section both vertically and horizontally, said housing being mounted on said base member and having a bottom of the same general configuration as said base member, said bottom having an opening overlying said intake opening, said housing being formed of sheet material and having a relatively flat, air-tight top wall portion and a plurality of flat, air-tight side wall portions, said housing forming with said base member an enclosure which is relatively impervious to air except for said intake opening and a front rectangular opening which extends over substantially the entire front area of the housing, a first filter designed to remove relatively coarse particles, said base member having a pair of supports slidably supporting said first filter adjacent said intake opening, said supports being open at the back to enable said first filter to be slidably removed from the rear of said housing and said base member having a flange across the front thereof to limit the forward movement of said filter and to conceal the same in the front of the cabinet, a second high efficiency particulate filter which is highly efficient in removing particles .5 microns in size or larger and means for detachably supporting said second filter adjacent to and extending across said front opening to cause said front opening to function as an outlet opening, said filter being formed of a sheet of filter material folded back and forth to provide a plurality of adjacent layers in engagement with each other which collectively form a filter of substantially the same rectangular configuration as said front opening, an ornamental screen extending across said second filter on the outer side of said filter and forming with said filter substantially the entire front wall of said housing, and a blower mounted in said enclosure on said horizontal wall of said base member and having an inlet directed downwardly toward said intake opening and coupled thereto, said intake being of generally the same cross-sectional configuration as said opening, and said blower having an outlet directed substantially horizontally to direct the peripheral air toward said high efficiency particulate filter at said front opening of said cabinet.

2. The air cleaner of claim 1 in which said housing is shaped to telescopically fit over said base member.

3. The air cleaner of claim 1 in which said second filter is slidably secured in said housing adjacent the front opening thereof.

4. The air cleaner of claim 3 in which said second filter is engaged upon its upstream side by a flexible gasket which slidably retains the filter in place and acts to seal against air leakage about the edges of the filter.

5. The air cleaner of claim 1 in which the ornamental screen is a metallic screen which covers the entire front of the filter and extends over the edges, said screen being sufficiently rigid to hold the corrugations of said filter together.

* * * * *